(12) United States Patent
Pierce (10) Patent No.: US 11,273,671 B2
(45) Date of Patent: Mar. 15, 2022

(54) AXLE DIFFERENTIAL GUARD

(71) Applicant: Caterpillar Inc., Deerfield, IL (US)

(72) Inventor: Dan J. Pierce, Deadwood, SD (US)

(73) Assignee: Caterpillar Inc., Peoria, IL (US)

(*) Notice: Subject to any disclaimer, the term of this patent is extended or adjusted under 35 U.S.C. 154(b) by 300 days.

(21) Appl. No.: 16/519,872

(22) Filed: Jul. 23, 2019

(65) Prior Publication Data

US 2021/0023879 A1 Jan. 28, 2021

(51) Int. Cl.
| | |
|---|---|
| *F16H 57/031* | (2012.01) |
| *B60B 35/16* | (2006.01) |
| *B60B 35/12* | (2006.01) |
| *F16H 57/037* | (2012.01) |
| *E02D 3/026* | (2006.01) |
| *F16H 57/02* | (2012.01) |

(52) U.S. Cl.
CPC .......... *B60B 35/166* (2013.01); *B60B 35/122* (2013.01); *F16H 57/031* (2013.01); *F16H 57/037* (2013.01); *B60B 2900/212* (2013.01); *E02D 3/026* (2013.01); *F16H 2057/02056* (2013.01)

(58) Field of Classification Search
CPC ................ F16H 57/031; F16H 57/037; F16H 2057/02056; F16H 57/0483–0486; B60B 35/166; B60B 35/122
See application file for complete search history.

(56) References Cited

U.S. PATENT DOCUMENTS

| | | | | |
|---|---|---|---|---|
| 5,839,531 | A | * | 11/1998 | McGee .................. F16N 31/006 180/69.1 |
| 8,152,674 | B2 | * | 4/2012 | Hayes ................. F16H 57/0483 475/160 |
| 8,402,878 | B2 | | 3/2013 | Schreiner et al. |
| 8,579,308 | B2 | | 11/2013 | Weeks et al. |
| 2017/0320522 | A1 | | 11/2017 | Lorenz et al. |

* cited by examiner

*Primary Examiner* — Thomas C Diaz (74) *Attorney, Agent, or Firm* — Schwegman, Lundberg & Woessner (57) ABSTRACT

A guard for protecting a drain plug and a ground-facing surface of an axle housing on a machine including a first portion and a second portion. The first portion has a body configured to be mounted to the axle housing to protect at least portion of the ground-facing surface of the axle housing. The body includes an opening configured to allow access to and removal of the drain plug through the opening. The second portion is removably couplable to the first portion. When the second portion is attached to the first portion, the second portion covers the opening to protect the drain plug. When the second portion is removed, the drain plug is accessible and removable to service oil in the axle housing.

19 Claims, 9 Drawing Sheets

AXLE DIFFERENTIAL GUARD

TECHNICAL FIELD

The present disclosure is directed generally, but not by way of limitation, to protecting axles, and, more particularly to protecting axles on landfill compactor machines.

BACKGROUND

Machines used in landfills, earth moving, agricultural and construction applications are subjected to extreme wear. Chassis components on the undercarriage of such machines can be damaged by material such as landfill waste, rubble and other debris that rub against the chassis components. Over time, the repeated abrasion can damage chassis components, including front and rear axle differentials.

Landfill compactors work in a particularly abrasive environment. The lower powertrain and bottom of the chassis drag in the rubble. The lowest point of the undercarriage is the axle housing which houses the axle and differential. Even though an axle housing can be made to be strong and durable, repeated abrasion over time can cause a hole to be formed in the axle housing resulting in a leak or broken housing.

Various undercarriage guards (e.g. shield, protectors) have been devised to protect components, however, the axle housing remains exposed. A drawback of undercarriage guards is that they can make it difficult to access components protected by the guard to perform service (e.g., maintenance) on the component.

One attempt to address the issue of protecting undercarriage components is described in U.S. Patent Publication No. 2017/0320522 to Lorenz et al. and published on Nov. 9, 2017. The '522 publication describes a suspension module having a subframe assembly. The subframe assembly can include a skid plate disposed at the bottom of the subframe. The skid plate can prevent impact damage to components that are received in a suspension module. While the '522 publication provides protection to some chassis components, the '522 publication fails to perform ideally and can prevent easy access to components requiring regular service.

Another attempt to address the issue of protecting undercarriage components is described in U.S. Pat. No. 8,402,878 to Schreiner et al. issued on Mar. 26, 2013. The '878 publication describes a skid plate to protect various components against a blast. While the '878 patent describes a skid plate in an attempt to protect components against a blast, the '878 patent fails to perform ideally in certain environments such as a landfill where the damage to undercarriage components occurs under different circumstances.

The present disclosure is directed to overcoming one or more of the shortcomings set forth above and/or other shortcomings in the art.

SUMMARY

In one aspect, the present disclosure relates to an axle system for a machine. The axle system includes an axle and a differential coupled to the axle to transmit motion from a power source to the axle. The axle and differential are disposed in a housing in an oil-sealed manner. The housing has an inner surface opposite an outer surface, the inner surface defining at least a portion of a cavity, the outer surface including a frame-facing surface and a ground-facing surface. A drain plug is removably couplable to the housing to seal and service oil in the housing.

The axle system also includes a guard (e.g., an axle guard, axle differential guard) mounted to the housing and covering at least a portion of the ground-facing surface of the housing. The guard includes a first portion and a second portion. The first portion is mounted to the housing by a first fastener, and a second portion is removably couplable to the first portion by a second fastener.

The first portion has a body defined by an inner surface opposite an outer surface and an aperture extending through the body from the inner surface to the outer surface. The aperture is located proximate the drain plug and the aperture is sized and shaped to allow access to and removal of the drain plug through the aperture.

The second portion has a second body defined by a drain plug-facing surface opposite a service access surface. When the second portion is mounted to the first portion, the second portion covers the aperture in the first portion. When the second portion is removed from the first portion, the drain plug is accessible and removable to service oil in the housing.

In another aspect, the present disclosure relates to a guard for protecting a drain plug and a ground-facing surface of an axle housing on a machine. The guard includes a first portion and a second portion. The first portion having a body configured to be mounted to the axle housing to protect at least portion of the ground-facing surface of the axle housing. The body includes an aperture configured to allow access to and removal of the drain plug through the aperture.

The second portion is removably couplable to the first portion. When the second portion is attached to the first portion, the second portion covers the aperture to protect the drain plug. When the second portion is removed from the first portion, the drain plug is accessible and removable to service oil in the axle housing.

In yet another aspect, the present disclosure relates to a guard for protecting an axle housing and a drain plug of a machine. The guard includes a first portion and a second portion. The first portion includes a first fastener to couple the first portion to the axle housing. The first portion has a body defined by an inner surface opposite an outer surface and an aperture extending through the body from the inner surface to the outer surface. The aperture is arranged to be located proximate the drain plug and the aperture is sized and shaped to allow access to, and removal of, the drain plug through the aperture.

The second portion includes a second fastener to couple the second portion to the first portion. The second portion has a second body defined by a second inner surface opposite a second outer surface. When the second portion is mounted to the first portion, the second portion covers the aperture. When the second portion is removed from the first portion, the drain plug is accessible and removable to service oil in the axle housing through the aperture.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Examples of guards for protecting axles and differentials disposed in an axle housing are described herein. Examples described in this disclosure prevent damage to an axle and differential of a landfill compactor. In addition to preventing damage, the examples described herein maintain the ability to service the oil in the axle without entirely removing the guard (e.g., axle guard, axle differential guard).

The guards described herein minimize failures by preventing material and debris from coming into direct contact with the bottom of the axle housing. The guards include a removable (e.g., de-couplable) portion to access the drain plug for servicing the oil in the axle.

Reference will now be made in detail to embodiments of the disclosure, examples of which are illustrated in the accompanying drawings. The same reference numerals generally refer to the same or like components throughout the drawings. Relative terms, such as, "substantially" or "about" are used to indicate a possible variation, for example, of ±10% in a stated numeric value, or to reflect a manufacturing tolerance. As defined herein, the use of the terms "or" or "and" includes "or", "and" or "and/or".

Figure 1:
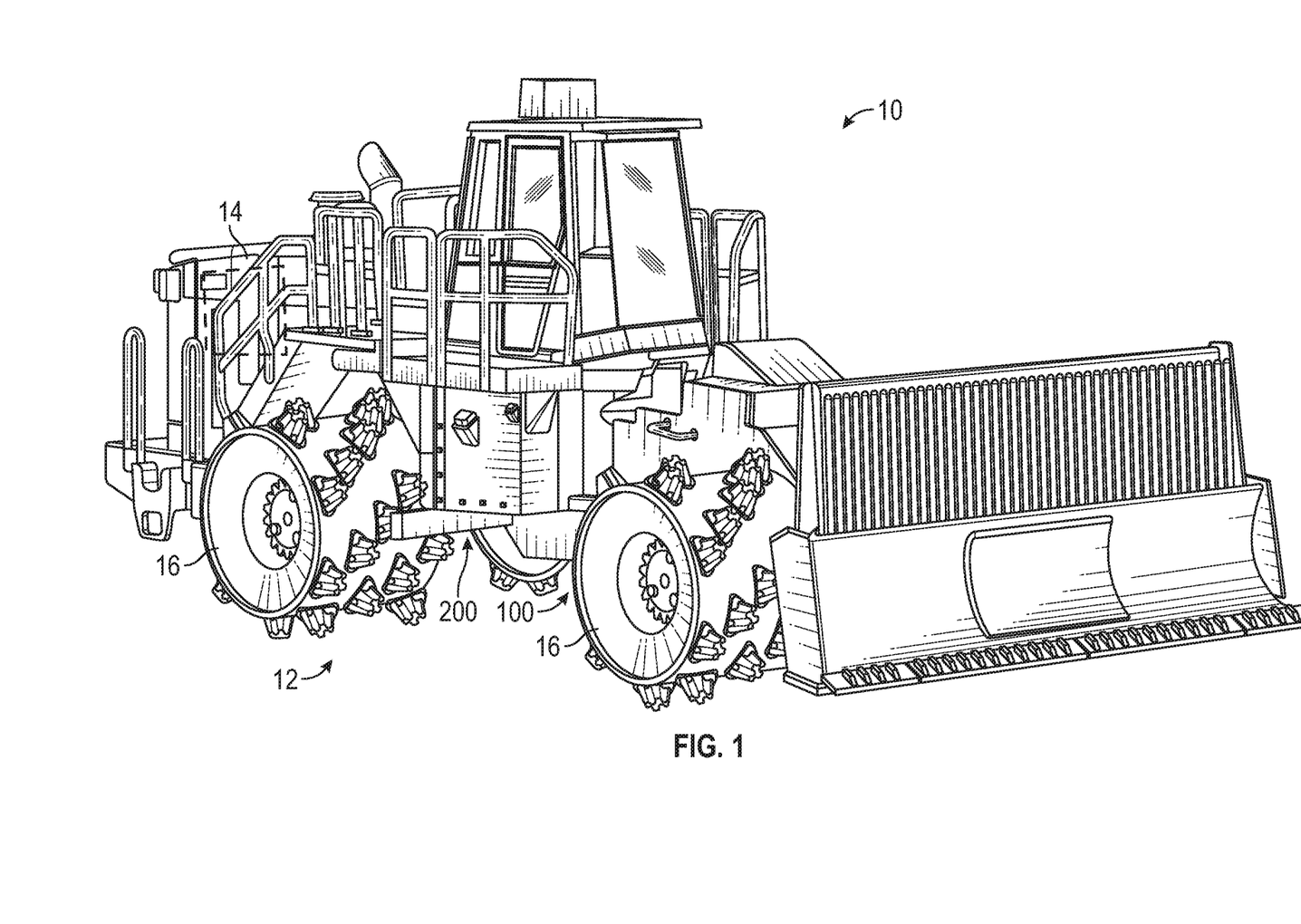
FIG. 1 is a perspective view of a landfill compactor machine which can include at least one of a front axle system having a front guard and a rear axle system having a rear guard, in accordance with at least one example.

FIG. 1 illustrates a perspective view of a machine 10. Machine 10 can include one or more axles systems such as a front axle system and/or a rear axle system. In the present example, the front and rear axle systems are different, but in some examples, the front and rear axle systems can be identical, mirror images, or more similar than as shown in the examples described herein.

As shown in FIG. 1, machine 10 includes drive system 12 that transfers motion from a prime mover 14 to wheels 16, tracks or the like. To cause the drive system 12 to move the machine 10 relative to a ground, the prime mover 14 generates rotational motion and transfers the rotational motion to the wheels 16 via intermediate components, including an axle system such as a front axle system 100 and a rear axle system 200 that cause the wheels 16 to rotate. The prime mover 14 can be any suitable type of power source known in the art, including, but not limited to a diesel-powered, gas-powered, or natural gas-powered engine, an electric powered motor, or hybrid power system.

In various examples, the machine 10 can be any suitable machine 10, such as a landfill compactor, a general-purpose machine, a tractor, a wheel loader, a backhoe, an excavator, a material handler and the like. While the machine 10 is illustrated in the context of a landfill compactor machine, it should be appreciated that the present disclosure is not thereby limited, and that a wide variety of other machines can include features of the example guards described herein.

Any use of the terms front and rear, forward and backward, are used in reference to an example axle system for a front or rear axle. However, the examples described herein can be used in a different orientation, or the front and rear axles may be reversed. In some examples, the guards described herein may be used on a machine 10 having only one axle, or more than two axles. In some examples a guard may not be provided on all the axles of the machine 10. The description and the accompanying claims apply to these examples, regardless of the use of the terms front and rear, forward and rearward used to describe the examples.

Figure 2:
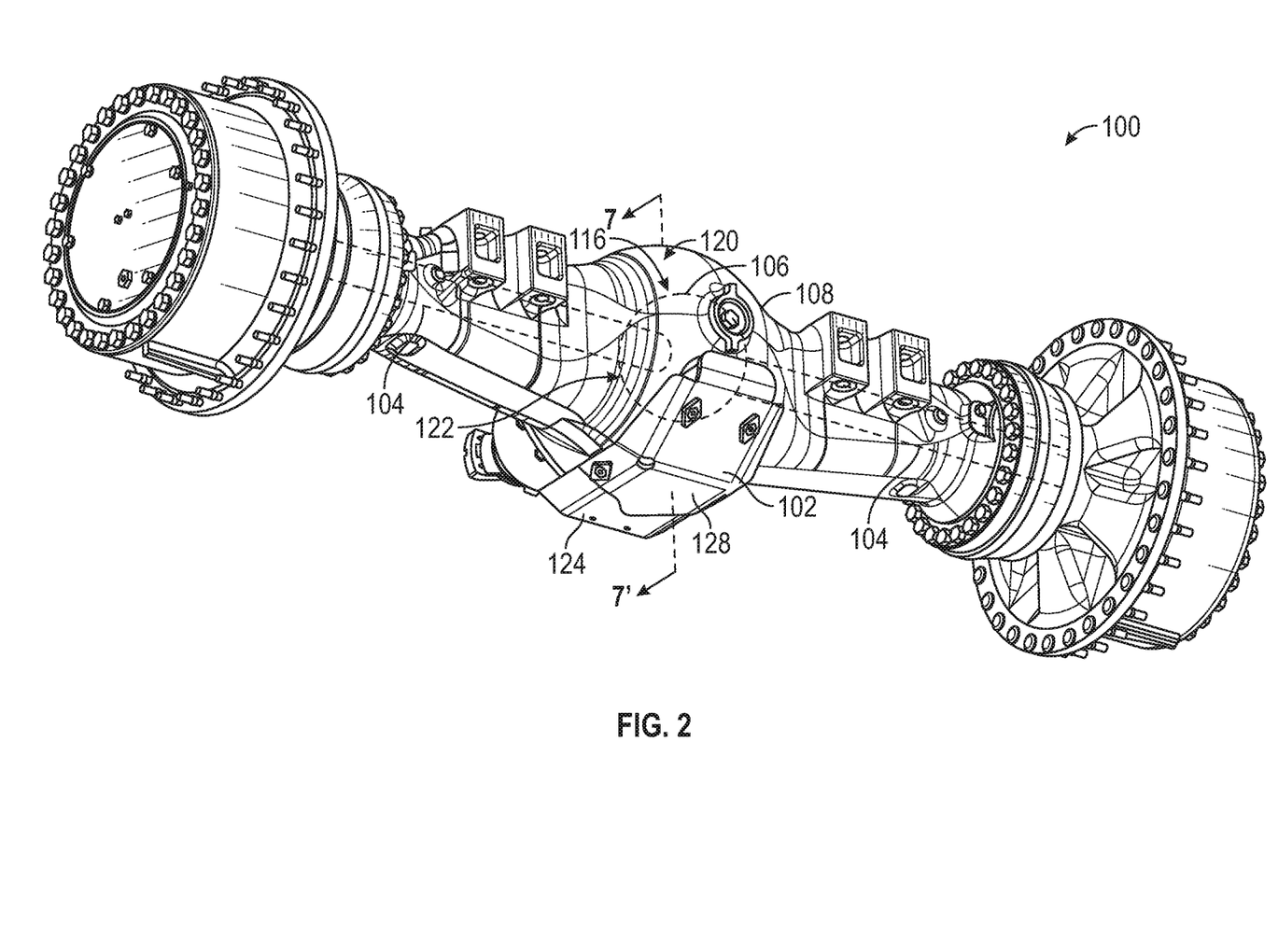
FIG. 2 is a bottom-front perspective view of a front axle system including a front guard suitable for use with the machine of FIG. 1, in accordance with at least one example.

FIG. 2 illustrates a bottom-front perspective view of an example front axle system 100 including a front guard 102 (hereinafter, guard) suitable for use with the machine 10 of FIG. 1. The guard 102 can also be referred to as an axle guard or an axle differential guard. The front axle system 100 is protected against wear by the guard 102, which is shown and described in FIGS. 2-7, in accordance with at least one example. In some examples, the guard 102 of FIG. 2, can be used on a rear axle system (e.g., 200). While the guard 102 may be used on some rear axle systems, another example of a guard is described with reference to FIGS. 8-13 that is shown and described with respect to the rear axle system 200.

The front axle system 100 includes an axle 104, a differential 106, an axle housing 108 (hereinafter, housing), a drain plug 110, a second drain plug 112 (FIG. 3) and the guard 102. The axle 104 can include one or more axle components, such as two half shafts or another type of axle assembly, as is known in the art. The differential 106 can be coupled to the axle 104 to transmit motion from a power source, such as the prime mover 14 (FIG. 1), to the axle 104. The axle 104 and the differential 106 are disposed in a cavity 114 (FIG. 7) of the housing 108 in an oil sealed manner. The cavity 114 can be at least a portion of a cavity.

Figure 3:
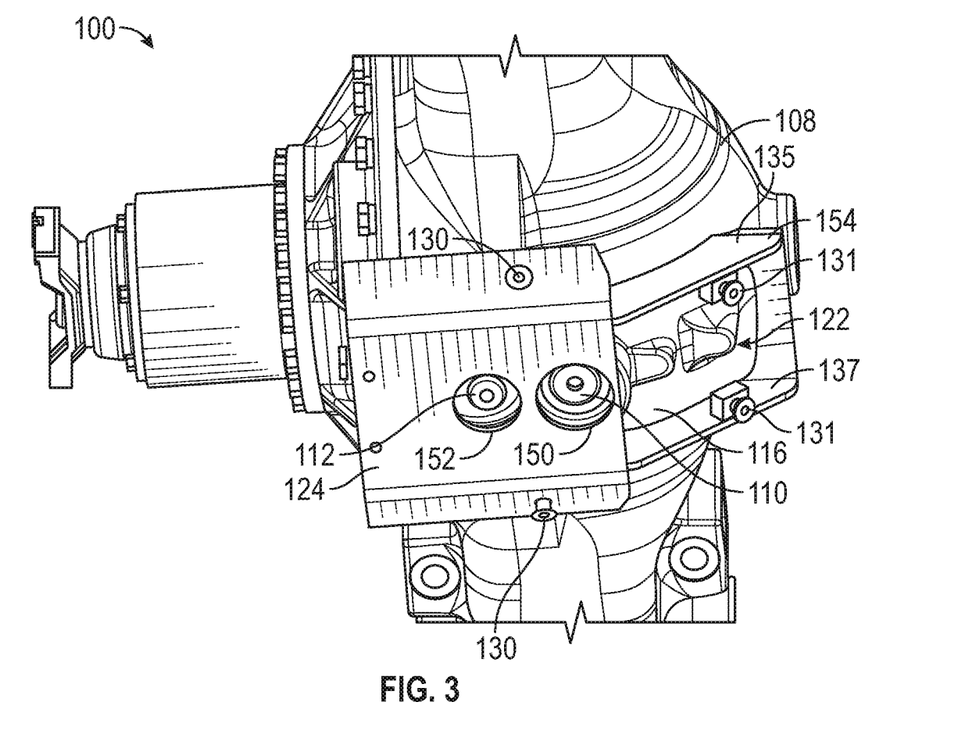
FIG. 3 is a bottom perspective view of a portion of the front axle system of FIG. 2 with a portion of the front guard removed, in accordance with at least one example.
Figure 7:
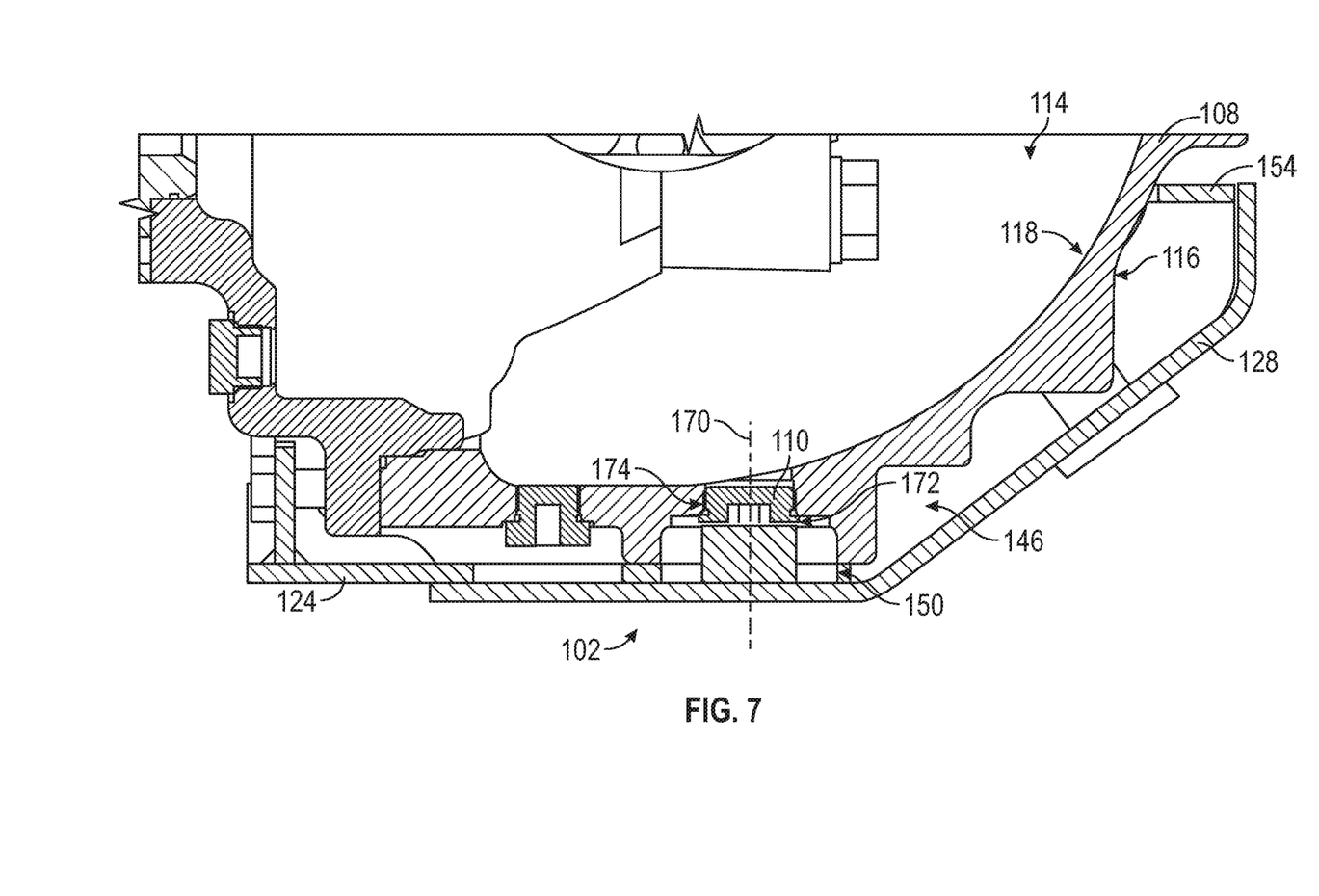
FIG. 7 is a general schematic depicting a partial cross-section of a housing of the front axle system of FIG. 2, taken along line 7-7' in FIG. 2, in accordance with at least one example.

As shown in FIG. 2, the housing 108 includes an outer surface 116. As shown in FIG. 7, the housing 108 also includes an inner surface 118 opposite the outer surface 116. The inner surface 118 defines the cavity 114 (FIG. 7) for housing the axle 104 and differential 106 (FIG. 2). The outer surface 116 can include a frame-facing surface 120 and a ground-facing surface 122. To protect the housing 108 from damage, the guard 102 can be mounted to the housing 108 to cover at least a portion of the ground-facing surface 122 of the housing 108 as well as the drain plug 110 (FIG. 3). The drain plug 110 is removable to service oil within the housing 108. The guard 102 can be shaped to interface with the outer surface 116 of the housing 108 in a complementary manner to prevent debris from passing between the guard 102 and the housing 108.

Also shown in FIG. 2, while the guard 102 provides protection to the ground-facing surface 122 of the housing 108 and the drain plug 110 (FIG. 3), the guard 102 undesirably covers the drain plug 110 and interferes with the ability to access the drain plug 110 to service oil in the axle system 100. To enable servicing the oil without removing the entire guard 102, the guard 102 can include a first portion 124 and a removable second portion 128.

FIG. 3 illustrates a bottom view of the axle system 100 of FIG. 2 with the second portion 128 of the guard 102 removed from the first portion 124. With the second portion 128 of the guard 102 removed, the drain plug 110 is accessible, and the oil in the housing 108 can be serviced (e.g., drained and replaced).

FIG. 3 also shows a mounting bracket 154. The mounting bracket 154 can be welded, or otherwise fastened by any suitable method, to the housing 108. The mounting bracket 154 can be configured to receive the second portion 128 and to couple the second portion to the mounting bracket 154 by one or more third fastener(s) 131 which are shown and described in further detail in FIG. 4. In some examples, instead of welding, or in addition to welding, the mounting bracket 154 onto the housing 108, the mounting bracket 154 can be secured to the housing 108 by bolts or screws. In some examples, instead of welding the mounting bracket 154 to the housing 108, the mounting bracket 154 can be integrally molded into the housing 108, such as by casting. The mounting bracket 154 is further shown and described with reference to FIG. 6.

Figure 4:
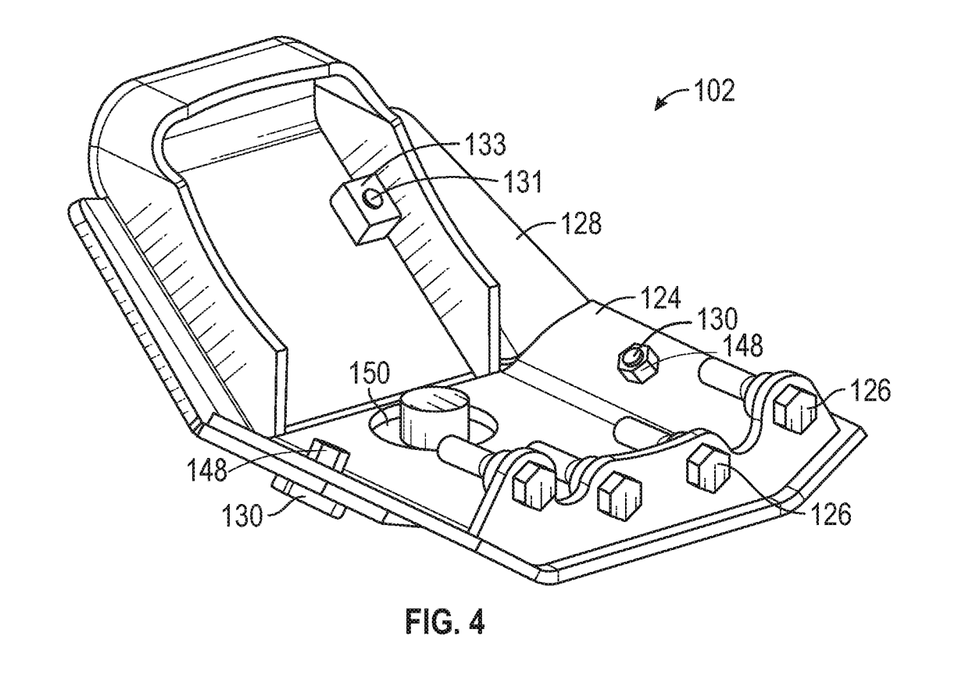
FIG. 4 is a rear perspective view of the front guard of FIG. 2, in accordance with at least one example.

FIG. 4 illustrates a rear perspective view of the guard 102 of FIG. 2. The first portion 124 can be configured to be mounted to the housing 108 (FIGS. 2 and 3) by a first fastener 126. The second portion 128 can be coupled to the first portion 124 by the one or more second fastener(s) 130 which can be received by second fastener receiving elements 148. The first fastener 126 can be received by the housing 108 for mounting the guard 102 to the housing 108. In some examples, and as shown, the first fastener 126 can include a plurality of first fasteners 126 and the second fastener 130 can include a plurality of second fasteners 130. To access the drain plug 110 (FIG. 3), the second portion 128 can be removable (de-couplable) from the first portion 124 by the removal of the second fasteners 130 and the third fasteners 131.

Figure 5:
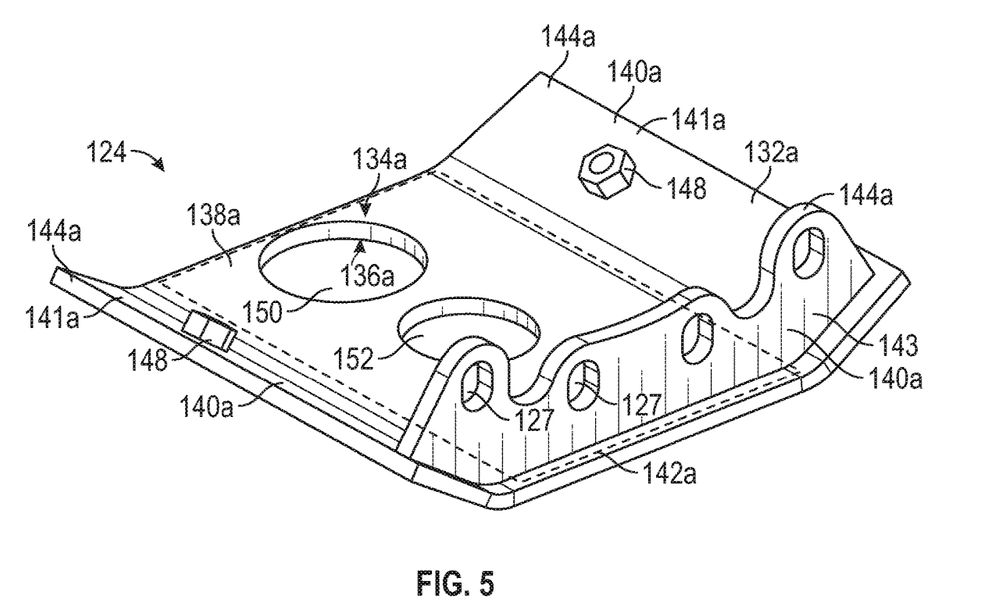
FIG. 5 is a rear perspective view of a first portion of the front guard of FIG. 2, in accordance with at least one example.

FIG. 5 illustrates a rear perspective view of the first portion 124 of the guard 102. As shown in FIG. 5, the first portion 124 can have a body 132a configured to be mounted to the housing 108 to protect at least a portion of the ground-facing surface 122 of the housing 108 (FIGS. 2 and 3). The body 132a can be defined by a body inner surface 134a opposite a body outer surface 136a. In some examples, the first portion 124 can include a base 138a and a flange 140a around the base 138a. In some examples the flange 140a can extend around at least a portion of a perimeter 142a of the base 138a. The flange 140a can be continuous or can be made up of any combination of sections of identical, different, continuous or interrupted flanges. The flange 140a can extend as being integrally formed with the base 138a as is shown in lateral flanges 141a, and/or can be formed as a separate piece as is shown in first end flange 143, which may be welded or otherwise fastened onto the base 138a. The first end flange 143 can be mounted to the housing 108 by the first fastener(s) 126, with the first fastener(s) extending through first receiving holes 127.

As shown in the first end flange 143, in some examples, the first end flange 143 and the lateral flanges 1411a may not necessarily extend away from the base 138a at the furthest edge of the perimeter 142a, but are within a perimeter region, such as within ±20% of the perimeter 142a, or possibly more preferably, within ±10% of the perimeter 142a. In some examples the flange 140a can surround all or most of the perimeter 142a of the base 138a. However, as shown in the example FIG. 5, the flange 140a may only extend around a portion of the base 138a.

The flange 140a can extend away from the base 138a towards the housing 108 and can terminate at a distal end portion 144a. All or a portion of the distal end portion 144a of the flange 140a can conform to the shape of the housing 108. The distal end portion 144a can be shaped to interface with the housing 108 in a complementary manner to prevent debris from getting in between the housing 108 and the guard 102 (FIGS. 2 and 3). In other words, debris is prevented from entering into an enclosure 146 formed by the guard 102 and the housing 108 (FIG. 7). The enclosure 146 need not be completely sealed, it can be a partial enclosure 146. Although in some examples, the enclosure 146 can be a sealed enclosure.

As shown in the combination of FIGS. 3-5, to couple the second portion 128 to the first portion 124, the first portion 124 can include one or more second fastener receiving elements 148, such as weld-nuts or bosses, for receiving the second fastener(s) 130 (FIGS. 3 and 4).

The body 132a of the first portion 124 can include an opening 150 configured to allow access to and removal of the drain plug 110 through the opening 150 (e.g., an aperture, a cut out). The opening 150 can be arranged to be located proximate the drain plug 110. The opening 150 can be sized and shaped to allow access to and removal of the drain plug 110 through the opening 150 when the second portion 128 (FIG. 3) is removed. The opening 150 can also be sized, located and shaped to allow substantially all the oil to drain through the opening 150 while servicing the oil in the housing 108. In some examples, the opening 150 is sized, located and shaped to allow all (e.g., substantially all) the oil to drain through the opening 150 during a standard course of servicing the oil in the housing 108, with no special measures or added steps other than removing the second portion 128.

The opening 150 can be formed in the base 138a. As shown, the opening 150 can be formed centrally (e.g., substantially centrally) in the base 138a with respect to the lateral flanges 141a and distal from the second end flange 143. In some examples, depending on the housing 108 shape that the guard 102 is configured to be attached to, the opening 150 can also, or alternatively, be formed in the flange 140a. The opening 150 can be formed as one single opening 150, or multiple openings. In some examples, and as shown in FIG. 3, the first portion 124 can include two openings. As shown in FIG. 3, in addition to the opening 150 to access the drain plug 110, a second opening 152 can provide access to a second drain plug 112. The second drain plug 112 can provide, for example, access to a cooling system that is separated from a lubrication system that drain plug 110 provides access to.

Figure 6:
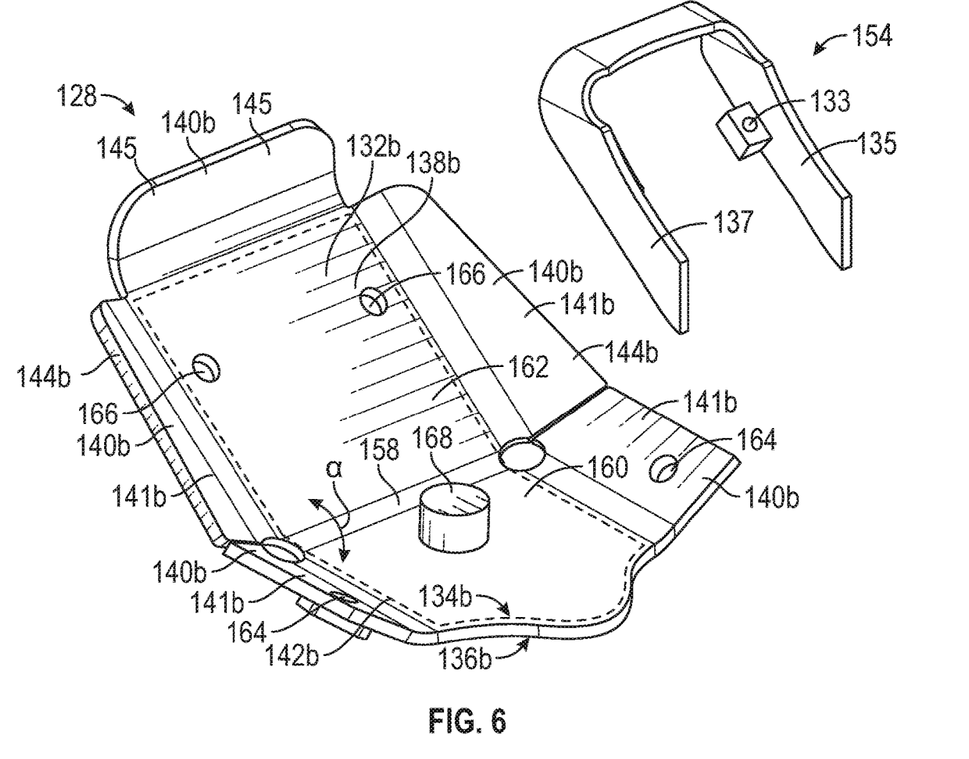
FIG. 6 is a rear perspective view of the second portion of the front guard of FIG. 2 and a mounting bracket shown in FIG. 3, in accordance with at least one example.

FIG. 6 illustrates a rear perspective view of the second portion 128 of the guard 102, as well as the mounting bracket 154 for mounting the second portion 128 to the housing 108 (as shown in FIG. 3).

The mounting bracket 154 can be generally u-shaped as shown but can take on any other suitable shape depending on the housing 108 shape. The mounting bracket 154 can include third fastener receiving elements 133 located within the u-shape of the mounting bracket 154, such as between first and second arms 135, 137.

In other examples, the third fastener receiving elements 133 can be disposed outside of the u-shape. In other examples, instead of the third fastener receiving elements 133 being mounts configured to receive the third fasteners 131, the third fastener receiving elements 133 can be a bolt fixed to the mounting bracket 154 (such as by spot welding), and the third fasteners 131 can be a nut that can be torqued onto a bolt. This is basically a similar fastening arrangement but reversed.

The second portion 128 can have a second body 132b defined by a second body inner surface 134b and a second body outer surface 136b opposite the second body inner surface 134b. The second portion 128 can be removably couplable to the first portion 124. When the second portion 128 is coupled to the first portion 124, the second portion 128 covers the opening 150 to protect the drain plug 110 (FIG. 2). When the second portion 128 is removed, the drain plug 110 is accessible and removable, through the opening 150, in order to service the oil in the axle system 100 (FIG. 3). In addition to the drain plug 110 being removable through the opening 150, the oil can also be drained through the opening 150.

In some examples, when the second portion 128 is coupled to the first portion 124, the second portion 128 also covers the second opening 152 (FIGS. 3 and 5) to protect the second drain plug 112 (FIG. 2). When the second portion 128 is removed, the second drain plug 112 is accessible and removable through the second opening 152, in order to service the fluid in a cooling system of the axle system 100 (FIG. 3). In addition to the second drain plug 112 being removable through the second opening 152, the fluid can also be drained through the second opening 152. The second body 132b can include a second base 138b to cover the opening 150. The second portion 128 can completely cover the opening 150 as shown in FIG. 6. However, in some examples, the second portion 128 can partially cover the opening 150, leaving part of the opening 150 exposed. In some examples the second portion 128 can be formed of a single or from multiple components.

As shown in FIG. 6, in some examples, the second portion 128 can include a second base 138b and a second flange 140b around the second base 138b. In some examples the second flange 140b can extend around at least a portion of a second perimeter 142b of the second base 138b. The second flange 140b can extend as being integrally formed with the second base 138b as is shown in second lateral flanges 141b, and a second end flange 145. However, in some examples, any part of the second flange 140b can be formed as a separate piece as described herein with respect to the first end flange 143 of FIG. 5.

The second flange 140b can include the second end flange 145 and the lateral flange(s) 141b. In some examples, the second end flange 145 and the second lateral flanges 141b do not necessarily extend away from the second base 138b at the furthest edge of the second perimeter 142b, but are within a second perimeter region, such as within 20% of the second perimeter 142b, or possibly more preferably, within 10% of the second perimeter 142b. In some examples the second flange 140b can surround all or most of the second perimeter 142b of the second base 138b. However, as shown in FIG. 6, the second flange 140b may only extend around a portion of the second base 138b.

The second flange 140b can extend away from the second base 138b towards the housing 108 and can terminate at a distal end portion 144b. All or a portion of the distal end portion 144b of the second flange 140b can conform to the shape of the housing 108. The distal end portion 144b can be shaped to interface with the housing 108 in a complementary manner to prevent debris from getting in between the housing 108 and the guard 102 (FIGS. 2 and 3). In other words, debris is prevented from entering into an enclosure 146 formed by the guard 102 and the housing 108 (FIG. 7). The enclosure 146 need not be completely sealed, it can be a partial enclosure. Though in some examples, the enclosure 146 can be a sealed enclosure.

The second base 138b can be formed such that it includes one or more bends 158. In some examples, and as shown in FIG. 6, a bend 158 can be disposed between two portions of the second base 138b, such as between a drain plug cover portion 160 and an axle protection portion 162. Together, the axle protection portion 162, the bend 158 and the drain plug cover portion 160, as well as the second flange 140b form the second body outer surface 136b. The second body outer surface 136b can be shaped to direct material flow around the housing 108, such as when driving over debris in a landfill.

The axle protection portion 162 can extend away (e.g. forward) from the drain plug cover portion 160 at an angle $\alpha$. In some examples, the angle $\alpha$ can be in a range between 15-75 degrees, depending on the shape of the axle housing 108 (FIG. 7). In a possibly preferred example, the angle $\alpha$ can be in a range between about 20 and 45 degrees.

In some examples, the second portion 128 can include second fastener-receiving holes 164, to accept the second fastener(s) 130 for coupling the second portion 128 to the first portion 124 (FIG. 4). The second portion 128 can also include third fastener-receiving holes 166 for coupling the second portion 128 to one or more third fastener receiving elements 133 in the mounting bracket 154 using one or more third fasteners 131. In some examples, instead of providing a mounting bracket 154, the second portion 128 can be mounted directly to the housing 108.

The second portion 128 can include a protuberance 168 on the second body inner surface 134b. The protuberance 168 can extend towards the drain plug 110 on the housing 108. As shown in FIG. 7, which illustrates a general schematic depicting a partial cross-section of a housing 108, guard 102 and drain plug 110 of the axle system 100 of FIG. 2, taken along line 7-7". The drain plug 110 and the protuberance 168 can extend generally along a drain plug axis 170 (FIG. 7). The protuberance 168 can be configured to terminate proximate the drain plug 110. The protuberance 168 can interface with the drain plug 110 to limit deflection of the second portion 128 towards the drain plug 110 along the drain plug axis 170. The protuberance 168 can also prevent the second portion 128 from pushing the first portion 124 towards the housing 108 (FIG. 7) if or when the second portion 128 is deflected by debris. For example, as the second portion 128 comes into contact with debris, the second portion 128 can be caused to flex inward toward the drain plug 110 under a force created by debris that the machine 10 (FIG. 1) is passing over. The protuberance 168 can limit deflection of the second portion 128 to a predetermined or specified amount of deflection. Such as limiting deflection to less than 5 mm. In a possibly preferred example, the protuberance 168 can limit deflection to less than 3 mm. In addition to preventing deflection of the second portion 128, the protuberance 168 can also serve to limit movement of the drain plug 110 along the drain plug axis 170 towards the second portion 128, providing a positive stop for the drain plug 110 that prevents movement of the seated drain plug.

As shown in FIG. 7, a gap 172 between the protuberance 168 and the drain plug 110 can be small. In some examples the gap 172 is in a range between 0.1-5 mm. In a possibly preferred example, the gap 172 can be about 2 mm or in a range between 1-3 mm. In some examples there can be no gap 172, but rather, the protuberance 168 and the drain plug 110 lay line-to-line. The protuberance 168 can be configured to extend through the opening 150 in the first portion 124.

When the second portion 128 is removed, oil is allowed to flow out of a drain plug aperture 174, through the opening 150. When the oil has been drained, the drain plug 110 can be replaced, the oil can be refilled and the second portion 128 re-coupled to the first portion 124 to protect the drain plug 110 during use of the machine 10.

Another example of an axle system 200 including a guard 202 is described with reference to FIGS. 8-13. Features of the example axle system 100 and guard 102 of FIGS. 2-7 can be combined and interchanged with features of the example axle system 200 and guard 202 of FIGS. 8-13. Like elements may be named with like numerals, therefore, like numerals may not be described in further detail.

Figure 8:
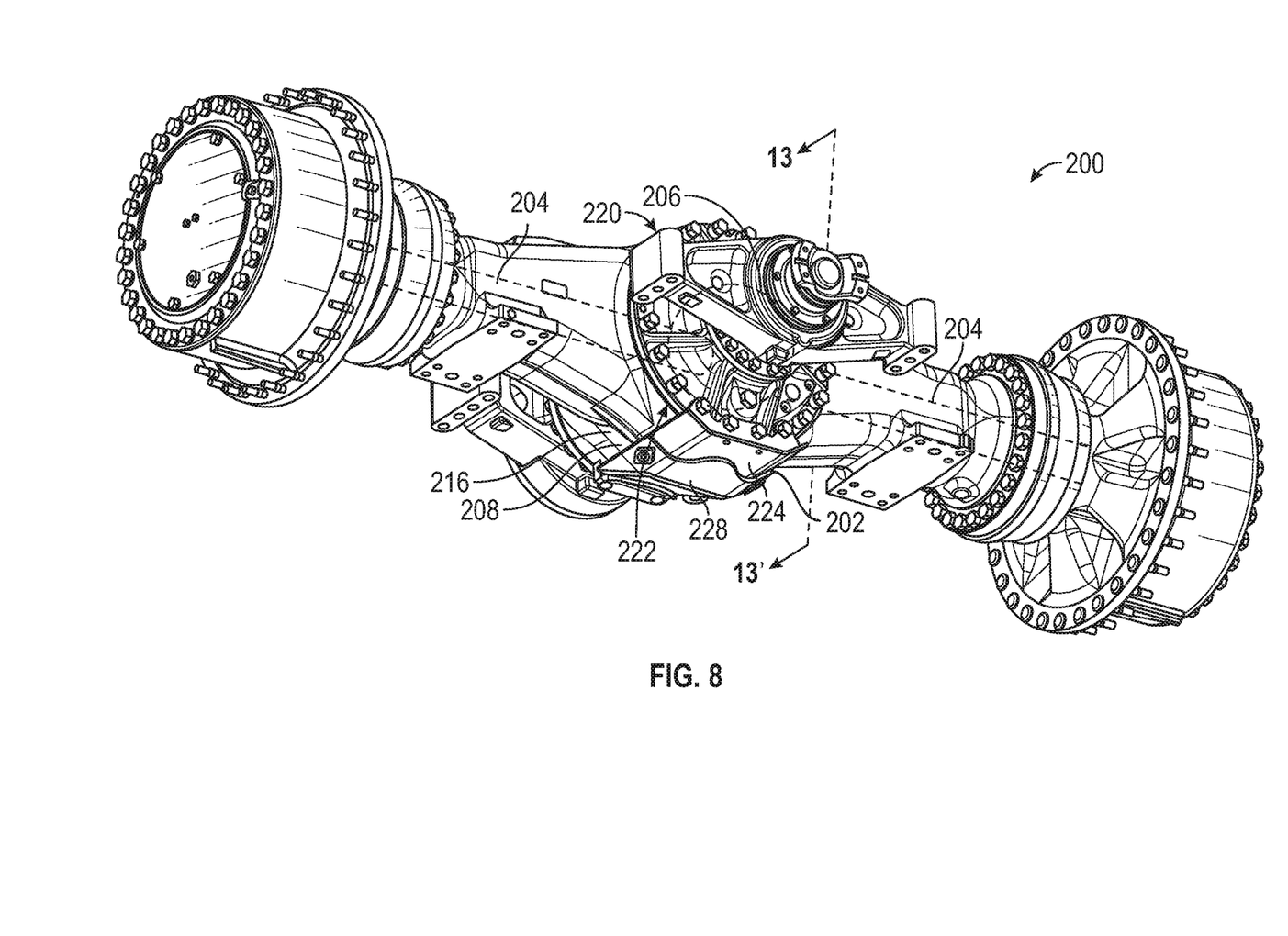
FIG. 8 is a bottom-front perspective view of a rear axle system including a rear guard suitable for use with the machine of FIG. 1, in accordance with at least one example.

FIG. 8 illustrates a bottom-front perspective view of an example rear axle system 200 including a rear guard 202 suitable for use with the machine 10 of FIG. 1. The rear axle system 200 is protected against wear by the rear guard 202, which is shown and described in FIGS. 8-13, in accordance with at least one example. In some examples, the rear guard 202 of FIG. 8, can be used on a front axle system (e.g., 100).

Similar to the front axle system 100, the rear axle system 200 (e.g., second axle system) includes an axle 204, a differential 206, an axle housing 208 (hereinafter, housing), a drain plug 210 (FIG. 3) and the rear guard 202 (hereinafter, guard). The axle 204 can include one or more axle components, such as two half shafts or another type of axle assembly, as is known in the art. The differential 206 can be coupled to the axle 204 to transmit motion from a power source, such as the prime mover 14 (FIG. 1), to the axle 204. The axle 204 and the differential 206 are disposed in a cavity 214 (FIG. 13) of the housing 208 in an oil sealed manner. The cavity 214 can be at least a portion of a cavity.

Figure 9:
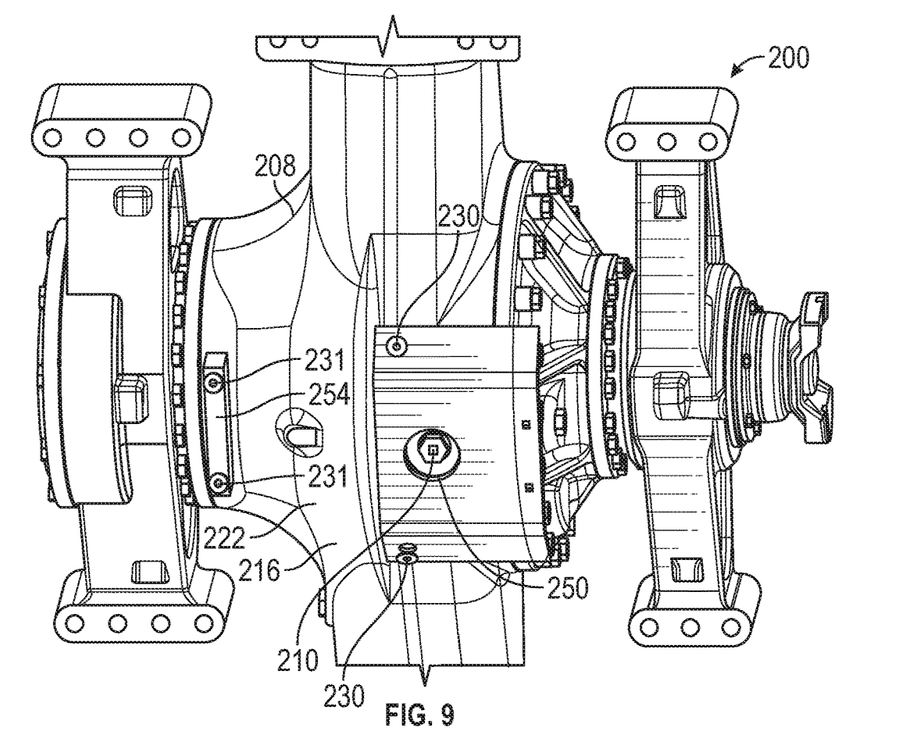
FIG. 9 is a bottom perspective view of a portion of the rear axle system of FIG. 8 with a portion of the rear guard removed, in accordance with at least one example.
Figure 13:
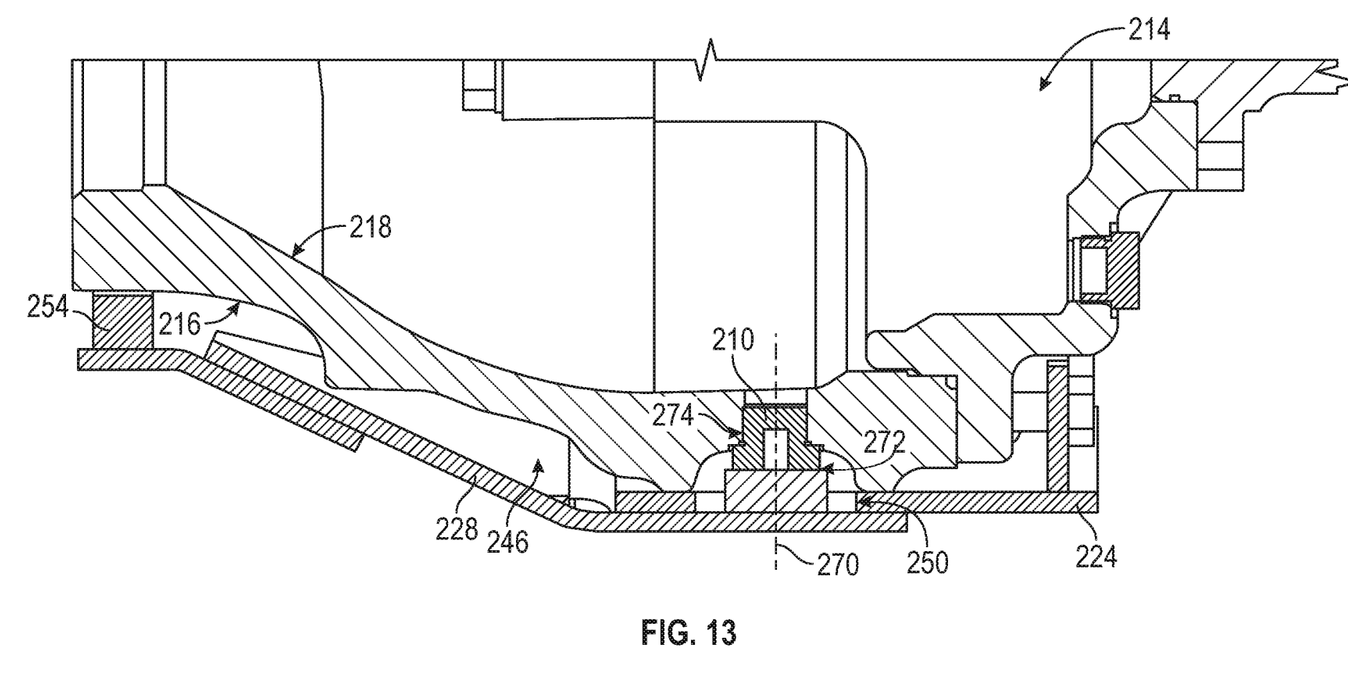
FIG. 13 is a general schematic depicting a partial cross-section of a housing of the rear axle system of FIG. 8, taken along line 13-13' in FIG. 8, in accordance with at least one example.

As shown in FIG. 8, the housing 208 includes an outer surface 216. As shown in FIG. 13, the housing 208 also includes an inner surface 218 opposite the outer surface 216. The inner surface 218 defines the cavity 214 (FIG. 13) for housing the axle 204 and differential 206 (FIG. 8). The outer surface 216 can include a frame-facing surface 220 and a ground-facing surface 222. To protect the housing 208 from damage, the guard 202 can be mounted to the housing 208 to cover at least a portion of the ground-facing surface 222 of the housing 208 as well as the drain plug 210 (FIG. 9). The drain plug 210 is removable to service oil within the housing 208. The guard 202 can be shaped to interface with the outer surface 216 of the housing 208 in a complementary manner to prevent debris from passing between the guard 202 and the housing 208.

Also shown in FIG. 8, while the guard 202 provides protection to the ground-facing surface 222 of the housing 208 and the drain plug 210 (FIG. 9), as with the guard 102 of FIGS. 2-7, the guard 202 undesirably covers the drain plug 210 and interferes with the ability to access the drain plug 210 to service oil in the axle system 200. To enable servicing the oil without removing the entire guard 202, the guard 202 can include a first portion 224 and a removable second portion 228.

FIG. 9 illustrates a front-bottom view of the axle system 200 of FIG. 8 with the second portion 228 of the guard 202 removed from the first portion 224. With the second portion 228 of the guard 202 removed, the drain plug 210 is accessible, and the oil in the housing 208 can be serviced (e.g., drained and replaced).

FIG. 9 also shows a mounting bracket 254. The mounting bracket 254 can be welded, or otherwise fastened by any suitable method, to the housing 208. The mounting bracket 254 can be configured to receive the second portion 228 and to couple the second portion 228 to the mounting bracket 254 by one or more third fastener(s) 231 (FIG. 9) which are shown and described in further detail in FIG. 12. In some examples, instead of welding, or in addition to welding, the mounting bracket 254 onto the housing 208, the mounting bracket 254 can be secured to the housing 208 by bolts or screws. In some examples, instead of welding the mounting bracket 254 to the housing 208, the mounting bracket 254 can be integrally molded into the housing 208, such as by casting. The mounting bracket 254 is further shown and described with reference to FIG. 12.

Figure 10:
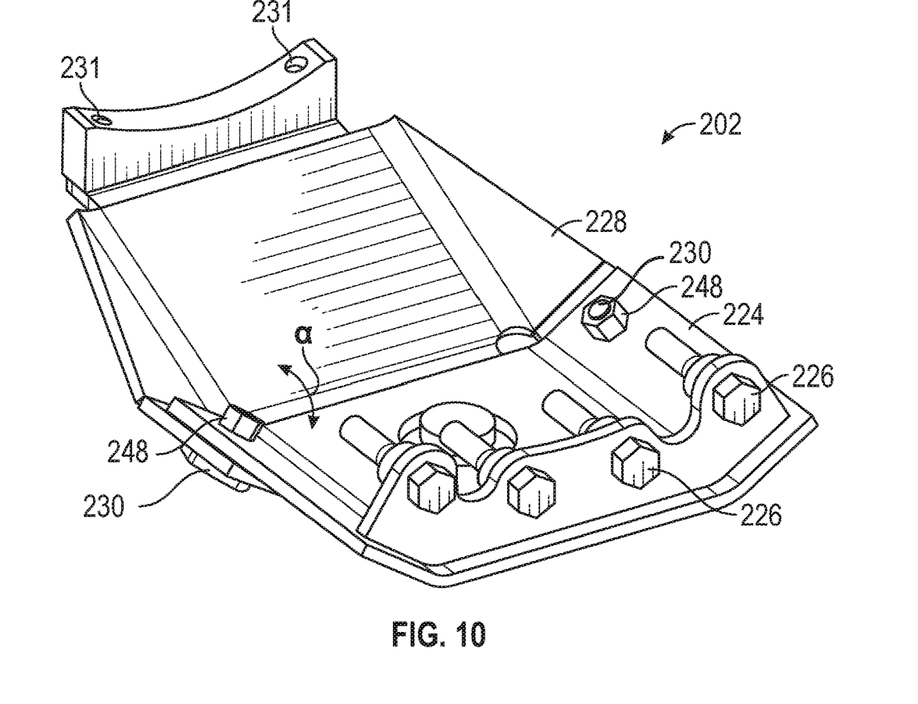
FIG. 10 is a front perspective view of the rear guard of FIG. 8, in accordance with at least one example.

FIG. 10 illustrates a front perspective view of the guard 202 of FIG. 8. The first portion 224 can be configured to be mounted to the housing 208 (FIGS. 8 and 9) by a first fastener 226, and the second portion 228 can be coupled to the first portion 224 by the one or more second fastener(s) 230 which can be received by one or more second fastener receiving elements 248. The first fastener 226 can be received by the housing 208 for mounting the guard 202 to the housing 208. In some examples, and as shown, the first fastener 226 can include a plurality of first fasteners 226 and the second fastener 230 can include a plurality of second fasteners 230. To access the drain plug 210 (FIG. 9), the second portion 228 can be removable (de-couplable) from the first portion 224 by the removal of the second fasteners 230 and the third fasteners 231.

Figure 11:
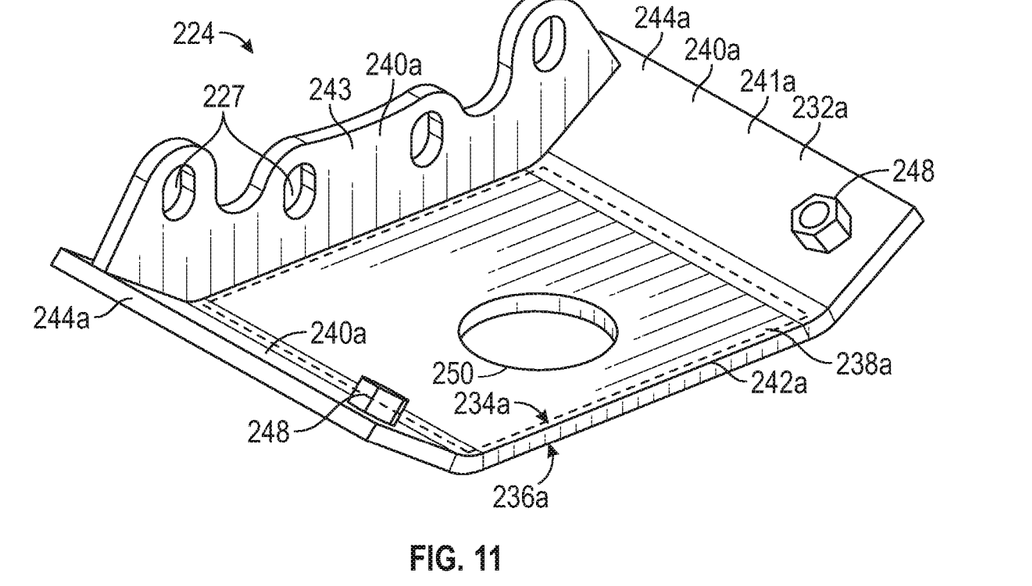
FIG. 11 is a rear perspective view of a first portion of the rear guard of FIG. 8, in accordance with at least one example.

FIG. 11 illustrates a rear perspective view of the first portion 224 of the guard 202 that is similar to the first portion 124 of guard 102 of FIG. 5 and can include the features of guard 102. As shown in FIG. 11, the first portion 224 can have a body 232a configured to be mounted to the housing 108 to protect at least a portion of the ground-facing surface 222 of the housing 208 (FIGS. 2 and 3). The body 232a can be defined by a body inner surface 234a opposite a body outer surface 236a. In some examples, the first portion 224 can include a first base 238a and a flange 240a around the first base 238a. In some examples the flange 240a can extend around at least a portion of a perimeter 242a of the base 238a. The flange 240a can be continuous or can be made up of any combination of sections of identical, different, continuous or interrupted flanges. The flange 240a can extend as being integrally formed with the first base 238a as is shown in lateral flanges 241a, and/or can formed as a separate piece as is shown in first end flange 243 (can be similar to first end flange 143 of FIG. 5), which may be welded or otherwise fastened onto the first base 238a. The first end flange 243 can be mounted to the housing 208 by the first fastener(s) 226, with the first fastener(s) extending through first receiving holes 227.

The flange 240a can extend away from the base 238a towards the housing 208 and can terminate at a distal end portion 244a. All or a portion of the distal end portion 244a of the flange 240a can conform to the shape of the housing 208. The distal end portion 244a can be shaped to interface with the housing 208 in a complementary manner to prevent debris from getting in between the housing 208 and the guard 202 (FIGS. 8 and 9). In other words, debris is prevented from entering into an enclosure 246 formed by the guard 202 and the housing 208 (FIG. 13). The enclosure 246 need not be completely sealed, it can be a partial enclosure 246. Although in some examples, the enclosure 246 can be a sealed enclosure.

The body 232a of the first portion 224 can include an opening 250 configured to allow access to and removal of the drain plug 210 through the opening 250 (e.g., an aperture, a cut out). The opening 250 can be arranged to be located proximate the drain plug 210. The opening 250 can be sized and shaped to allow access to and removal of the drain plug 210 through the opening 250 when the second portion 228 (FIG. 9) is removed. The opening 250 can also be sized, located and shaped to allow substantially all the oil to drain through the opening 250 while servicing the oil in the housing 208. In some examples, the opening 250 is sized, located and shaped to allow all (e.g., substantially all) the oil to drain through the opening 250 during a standard course of servicing the oil in the housing 208, with no special measures or added steps other than removing the second portion 228.

The opening 250 can be formed in the base 238a. As shown, the opening 250 can be formed centrally in the base 238a with respect to the lateral flanges 241a and distal from the first end flange 243. In some examples, depending on the housing 208 shape that the guard 202 is configured to be attached to, the opening 250 can also, or alternatively, be formed in the flange 240a. The opening 250 can be formed as one single opening 250, or multiple openings. In some examples, and as shown in FIG. 3, the first portion 124 can include two openings.

Figure 12:
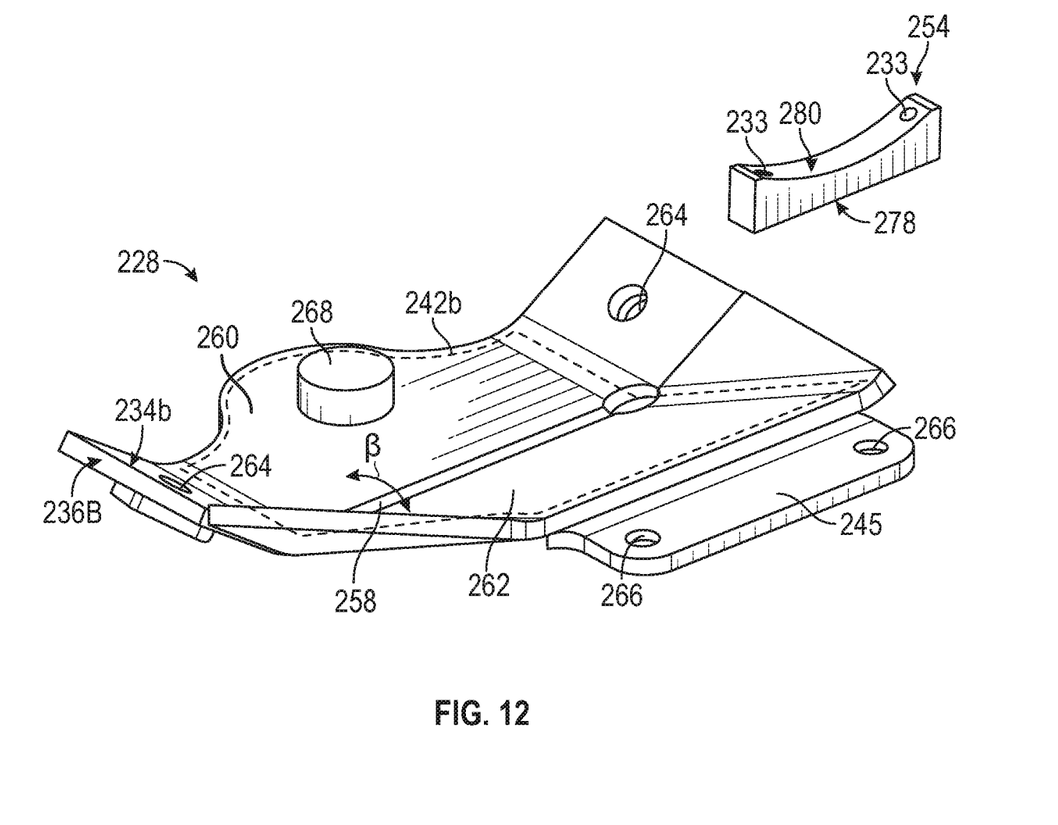
FIG. 12 is a rear perspective view of the second portion of the rear guard of FIG. 8, and a mounting bracket of FIG. 9, in accordance with at least one example.

FIG. 12 illustrates a rear perspective view of the second portion 228 of the guard 202, as well as the mounting bracket 254 for mounting the second portion 228 to the housing 208 (as shown in FIG. 9).

The mounting bracket 254 can be generally be a block-like component having a generally planar guard interface surface 278 and a curved housing interface surface 280 opposite the guard interface surface 278. The guard interface surface 278 can be configured to interface with a second end flange 245. The housing interface surface 280 can be configured to interface with the outer surface 116 of the housing 208 (FIG. 8). The mounting bracket 254 can take on any other suitable shape depending on the housing 208 shape. The mounting bracket 254 can include second fastener receiving elements 233 extending through the mounting bracket 254 that are configured to receive the second fasteners 230. The second end flange 245 can be arranged parallel (e.g., substantially parallel) with the base 238b or a flat ground that the machine 10 is traveling over.

The second portion 228 can have a second body 232b defined by a second body inner surface 234b and a second body outer surface 236b opposite the second body inner surface 234b. The second portion 228 can be removably couplable to the first portion 224. When the second portion 228 is coupled to the first portion 224, the second portion 228 covers the opening 250 to protect the drain plug 210 (FIG. 8). When the second portion 228 is removed, the drain plug 210 is accessible and removable, through the opening 250, in order to service the oil in the axle system 200 (FIG. 9). In addition to the drain plug 210 being removable through the opening 250, the oil can also be drained through the opening 250.

The second portion 228 can completely cover the opening 250 as shown in FIG. 13. However, in some examples, the second portion 228 can partially cover the opening 250, leaving part of the opening 250 exposed. In some examples the second portion 228 can be formed of a single or from multiple components.

As shown in FIG. 6, in some examples, the second portion 228 can include a second base 238b and a second flange 240b around the second base 238b. In some examples the second flange 240b can extend around at least a portion of a second perimeter 242b of the second base 238b. The second flange 240b can extend as being integrally formed with the second base 238b as is shown in second lateral flanges 241b. However, in some examples, any part of the second flange 240b can be formed as a separate piece as described herein and shown with respect to second end flange 245 (FIG. 13) or first end flange 243 of FIG. 11.

The second flange 140b can include a second end flange 245 and lateral flange(s) 241b. In some examples, the second end flange 245 and the second lateral flanges 241b do not necessarily extend away from the second base 238b at the furthest edge of the second perimeter 242b, but are within a second perimeter region, such as within 20% of the second perimeter 242b, or possibly more preferably, within 10% of the second perimeter 242b. In some examples the second flange 240b can surround all or most of the second perimeter 242b of the second base 238b. However, as shown in FIG. 12, the second flange 240b may only extend around a portion of the second base 238b.

The second flange 240b can extend away from the second base 238b towards the housing 208 and can terminate at a distal end portion 244b. All or a portion of the distal end portion 244b of the second flange 240b can conform to the shape of the housing 208. The distal end portion 244b can be shaped to interface with the housing 208 in a complementary manner to prevent debris from getting in between the housing 208 and the guard 202. (FIG. 8). In other words, debris is prevented from entering into an enclosure 246 formed by the guard 202 and the housing 208 (FIG. 13). The enclosure 246 need not be completely sealed, it can be a partial enclosure. Though in some examples, the enclosure 246 can be a sealed enclosure.

The second base 238b can be formed such that it includes one or more bends 258. In some examples, and as shown in FIG. 6, a bend 258 can be disposed between two portions of the base 238b, such as between a drain plug cover portion 260 and an axle protection portion 262. Together, the axle protection portion 262, the bend 258 and the drain plug cover portion 260, as well as the second flange 240b form the second body outer surface 236b. The second body outer surface 236b can be shaped to direct material flow around at least a portion of the housing 208.

The axle protection portion 262 can extend away (e.g. rearward) from the drain plug cover portion 260 at an angle β. In some examples, the angle β can be in a range between 15-75 degrees, depending on the shape of the axle housing 108 (FIG. 7). In a possibly preferred example, the angle β can be in a range between about 20 and 45 degrees.

In some examples, the second portion 228 can include fastener-receiving holes 264, to accept the second fastener(s) 230 for coupling the second portion 228 to the first portion 224 (FIG. 4). The second portion 128 can also include second fastener-receiving holes 266 for coupling the second portion to one or more second fastener receiving elements 233 in the mounting bracket 254, or in some examples, directly to the housing 208.

The second portion 228 can include a protuberance 268 on the second body inner surface 234b. FIG. 13 illustrates a general schematic depicting a partial cross-section of the housing 208, the guard 202 and the drain plug 210 of the axle system 200 of FIG. 8, taken along line 13-13". The protuberance 268 can extend towards the drain plug 210 on the housing 208. The drain plug 210 and the protuberance 268 can extend generally along a drain plug axis 270 (FIG. 13) and the protuberance 268 can be configured to terminate proximate the drain plug 210. The protuberance 268 can interface with the drain plug 210 to limit deflection of the second portion 228 towards the drain plug 210 along the drain plug axis 270. The protuberance 268 can also prevent the second portion 228 from pushing the first portion 224 towards the housing 208 (FIG. 8) when the second portion 228 is deflected. For example, as the second portion 228 comes into contact with debris, the second portion 228 can be caused to flex inward toward the drain plug 210 under a force created by debris the machine 10 (FIG. 1) is passing over. The protuberance 268 can limit deflection of the second portion 228 to a predetermined or specified amount of deflection. Such as limiting deflection to less than 5 mm. In a possibly preferred example, the protuberance 268 can limit deflection to less than 3 mm. In addition to preventing deflection of the second portion 228, the protuberance 268 can also serve to limit movement of the drain plug 210 along the drain plug axis 270 towards the second portion 228, providing a positive stop for the drain plug 210 that prevents movement of the seated drain plug 210.

As shown in FIG. 13, a gap 272 between the protuberance 268 and the drain plug 210 can be provided. The gap 272 can be small. In some examples the gap 272 is in a range between 0.1-5 mm. In a possibly preferred example, the gap 272 can be about 2 mm or in a range between 1-3 mm. In some examples there can be no gap 272, but rather, the protuberance 168 and the drain plug 110 lay line-to-line.

When the second portion 228 is removed, oil is allowed to flow out of a drain plug aperture 274, through the opening 250. When the oil has been drained, the drain plug 210 can be replaced, the oil can be refilled and the second portion 228 re-coupled to the first portion 224 to protect the drain plug 210 during use of the machine 10.

INDUSTRIAL APPLICABILITY

In general, the foregoing disclosure finds utility in various industrial applications, such as in an axle system 100 of a machine 10 such as a landfill compactor, as is shown and described with reference to FIGS. 1-13. The axle systems 100 and 200 can be used to provide rotation to wheels 16 to traverse the machine 10 across landfill debris.

Some benefits of the axle systems 100 and 200, including the guards 102 and 202 described herein include an improvement in durability of the axle systems 100 and 200, and the ability to service the oil in the axle systems 100 and 200 without entirely removing the guards 102 and 202. To service the oil in the axle systems 100 and 200, first portions 124, 224 of the guards 102, 202 remain coupled to the axle systems 100 200, while second portions 128, 228 of the guards 102, 202 that cover the drain plugs 110, 210 is removed. Openings 150, 250 in the first portions 124, 224 of the guards 102, 202, allow access to the drain plugs 110, 210 and allows oil to pass through the first portions 124, 224 during draining.

It will be apparent to those skilled in the art that various modifications and variations can be made. Other embodiments will be apparent to those skilled in the art from consideration of the specification and the practice of the disclosed machine. It is intended that the specification and examples be considered as exemplary only, with a true scope being indicated by the claims and their equivalents.

What is claimed is:

1. An axle system for a machine, the axle system comprising:
   an axle;
   a differential coupled to the axle to transmit motion from a power source to the axle;
   a housing having an inner surface opposite an outer surface, the inner surface defining at least a portion of a cavity, the outer surface including a frame-facing surface and a ground-facing, surface, wherein the axle and differential are disposed in the cavity in an oil sealed manner;
   a drain plug removably couplable to the housing to service oil in the housing; and
   a guard mounted to the housing and covering at least a portion of the ground-facing surface of the housing, the guard comprising:
   a first portion mounted to the housing by a first fastener; and
   a second portion removably couplable to the first portion by a second fastener,
   wherein the first portion has a first body defined by a first inner surface opposite a first outer surface and an opening extending through the first body from the first inner surface to the first outer surface, wherein the opening is located proximate the drain plug and the opening is sized and shaped to allow access to and removal of the drain plug through the opening,
   wherein the second portion has a second body defined by a second inner surface opposite a second outer surface and having a shape conforming to the axle housing in a complementary manner and adapted to direct material flow around the housing, wherein when the second portion is coupled to the first portion, the second portion covers the opening, and wherein when the second portion is removed, the drain plug is accessible and removable to service oil in the housing.

2. The axle system of claim 1, wherein the guard and the housing form an enclosure between the guard and the housing, wherein the first portion includes a first base and a first flange around the first base, the first flange extending away from the first base and terminating at a distal end portion.

3. The axle system of claim 1, further comprising:
   a mounting bracket coupled to the housing, wherein the mounting bracket includes an attachment member configured to receive a third fastener to couple the second portion to the mounting bracket.

4. The axle system of claim 1, wherein the second portion and the first portion overlap one another such that the second inner surface faces the first outer surface.

5. The axle system of claim 1, wherein the second portion completely covers the opening.

6. The axle system of claim 1, wherein the guard and the housing form an enclosure, wherein the second inner surface includes a protuberance configured to extend through the opening into the enclosure towards the drain plug.

7. The axle system of claim 6, wherein the drain plug extends along a drain plug axis, and wherein the protuberance interfaces with the drain plug to limit deflection of the second portion towards the drain plug along the drain plug axis to a specified amount of deflection, and to limit movement of the drain plug along the drain plug axis towards the second portion.

8. A guard for protecting a drain plug and a ground-facing surface of an axle housing on a machine, the guard comprising:

a first portion having a body configured to be mounted to the axle housing to protect at least a portion of the ground-facing surface of the axle housing, the body having an inner surface and an outer surface opposite the inner surface, the body including an opening extending from the inner surface to the outer surface, the opening configured to allow access to and removal of the drain plug through the opening; and a second portion removably couplable to the first portion and having a shape conforming to the axle housing in a complementary manner and adapted to direct material flow around the housing, wherein when the second portion is attached to the first portion, the second portion covers the opening to protect the drain plug, and wherein when the second portion is removed, the drain plug is accessible and removable to service oil in the axle housing.

9. The guard of claim 8, further comprising:

a mounting bracket configured to be coupled to the axle housing, wherein the mounting bracket includes an attachment member configured to receive a fastener to couple the second portion to the mounting bracket.

10. The guard of claim 8, wherein the second portion includes a second body having a second inner surface and a second outer surface opposite the second inner surface, wherein the second portion and the first portion overlap one another such that the second inner surface faces the outer surface.

11. The guard of claim 8, wherein the second portion is configured to completely cover the opening.

12. The guard of claim 8, wherein the second portion includes a protuberance configured to extend towards the drain plug.

13. The guard of claim 8, wherein the second portion includes a protuberance configured to limit deflection of the second portion towards the drain plug along a drain plug axis to a specified amount of deflection, and to limit movement of the drain plug along the drain plug axis towards the second portion.

14. A guard for protecting an axle housing and a drain plug of a machine, the guard comprising:

a first portion having a body defined by an inner surface and an outer surface opposite the inner surface and an opening extending through the body from the inner surface to the outer surface, wherein the opening is arranged to be located proximate the drain plug, and wherein the opening is sized and shaped to allow access to, and removal of, the drain plug through the opening;

a first fastener to couple the first portion to the axle housing;

a second portion having a second body defined by second inner surface and a second outer surface opposite the second inner surface and having a shape conforming to the axle housing in a complementary manner and adapted to direct material flow around the housing, wherein when the second portion is coupled to the first portion, the second portion covers the opening, and wherein when the second portion is removed from the first portion, the drain plug is accessible and removable to service oil in the axle housing through the opening; and a second fastener to couple the second portion to the first portion.

15. The guard of claim 14, wherein the body and the second body together form a base and a flange around the base extending away from the base and terminating at a distal end portion.

16. The guard of claim 14, further comprising:

a mounting bracket configured to be coupled to the axle housing, wherein the mounting bracket includes an attachment member configured to receive a third fastener to couple the second portion to the mounting bracket.

17. The guard of claim 14, wherein the opening is sized, located and shaped to allow substantially all the oil to drain through the opening.

18. The guard of claim 14, wherein the second inner surface includes a protuberance arranged to extend towards the drain plug.

19. The guard of claim 18, wherein the drain plug extends along a drain plug axis, and wherein the protuberance interfaces with the drain plug to limit deflection of the second portion towards the drain plug along the drain plug axis to a specified amount of deflection, and to limit movement of the drain plug along the drain plug axis towards the second portion.

* * * * *